United States Patent [19]

Bortolin

[11] 4,456,276

[45] Jun. 26, 1984

[54] BICYCLE ASSEMBLY

[76] Inventor: Peter Bortolin, 4/40 Cannon St., Stanmore, New South Wales, 2041, Australia

[21] Appl. No.: 366,506

[22] Filed: Apr. 8, 1982

[30] Foreign Application Priority Data

Apr. 15, 1981 [AU] Australia .............................. PE8459
May 27, 1981 [AU] Australia .............................. PE9046
Jan. 29, 1982 [AU] Australia .............................. PE2491

[51] Int. Cl.³ ............................................ B62M 1/04
[52] U.S. Cl. .................................................. 280/257
[58] Field of Search ............................... 280/257, 253

[56] References Cited

U.S. PATENT DOCUMENTS

| 608,674 | 8/1898 | Harshner | 280/257 |
| 616,408 | 12/1898 | Courtwright | 280/257 X |
| 1,202,656 | 10/1916 | Biot | 280/257 |
| 2,424,639 | 7/1947 | Soibirai | 280/257 |

FOREIGN PATENT DOCUMENTS

| 90023 | 11/1895 | Fed. Rep. of Germany . | |
| 2361093 | 6/1975 | Fed. Rep. of Germany . | |
| 375243 | 5/1907 | France | 280/257 |
| 21832 | 3/1921 | France . | |
| 867669 | 11/1941 | France . | |
| 1102611 | 5/1975 | France . | |
| 2412456 | 7/1979 | France . | |
| 413669 | 3/1946 | Italy | 280/257 |
| 3579 | of 1901 | United Kingdom | 280/257 |

Primary Examiner—John A. Pekar
Attorney, Agent, or Firm—Ladas & Parry

[57] ABSTRACT

A bicycle having a frame, a driven wheel rotatably supported on the frame, a drive sprocket rotatably mounted on the frame, a driven sprocket fixed to said wheel, a chain extending between the sprockets; a pair of levers pivotally attached to the frame, and a pair of links extending between the drive sprocket and levers, a pedal fixed to the extremity of each lever, and wherein said drive sprocket is rotated by the reciprocation of said pedals.

3 Claims, 11 Drawing Figures

BICYCLE ASSEMBLY

The present invention relates to a drive mechanism for conversion of reciprocatory to rotary motion and/or vice versa. The invention is particularly but not exclusively intended for velocipede drive applications.

A conventional bicycle drive mechanism employs a pair of pedals which are coupled by a chain and sprockets to the rear wheel of the bicycle. In this arrangement the pedals move in circular paths during which the effective torque applied to the rear wheel varies in cyclic manner. Only a relatively small proportion of each cycle is effective for maximum transfer of power to the rear wheel so that much of the pedal movement, in the sense of obtaining power transfer, is wasted. It was contemplated that if the total amount of pedal travel could be reduced while retaining the average drive ratio (e.g. gear ratio), the required pedal effort will be more uniform and fatigue to the rider will be reduced. The invention is generally directed to accomplishing this result.

There is disclosed herein a velocipede including a frame; at least one driven wheel rotatably mounted on the frame; and a pedal drive assembly operatively mounted on the frame and operatively associated with said wheel to drive the wheel; said assembly comprising a pair of pedal levers pivotally mounted on the frame so that one extremity of each lever is reciprocated between an upper and lower position, a pedal mounted on the said one extremity of each lever, pivot means pivotally mounting said levers on said frame so as to be pivotable about a first axis, a drive sprocket mounted on said frame for rotation about a fixed second axis, a driven sprocket attached to said wheel so as to drive same, said driven sprocket being rotatable about the rotational axis of said wheel, and endless chain means coupling the sprockets, and wherein said first axis is spaced from said second axis.

A preferred form of the present invention will now be described by way of example with reference to the accompanying drawings, wherein.

Figure 1:
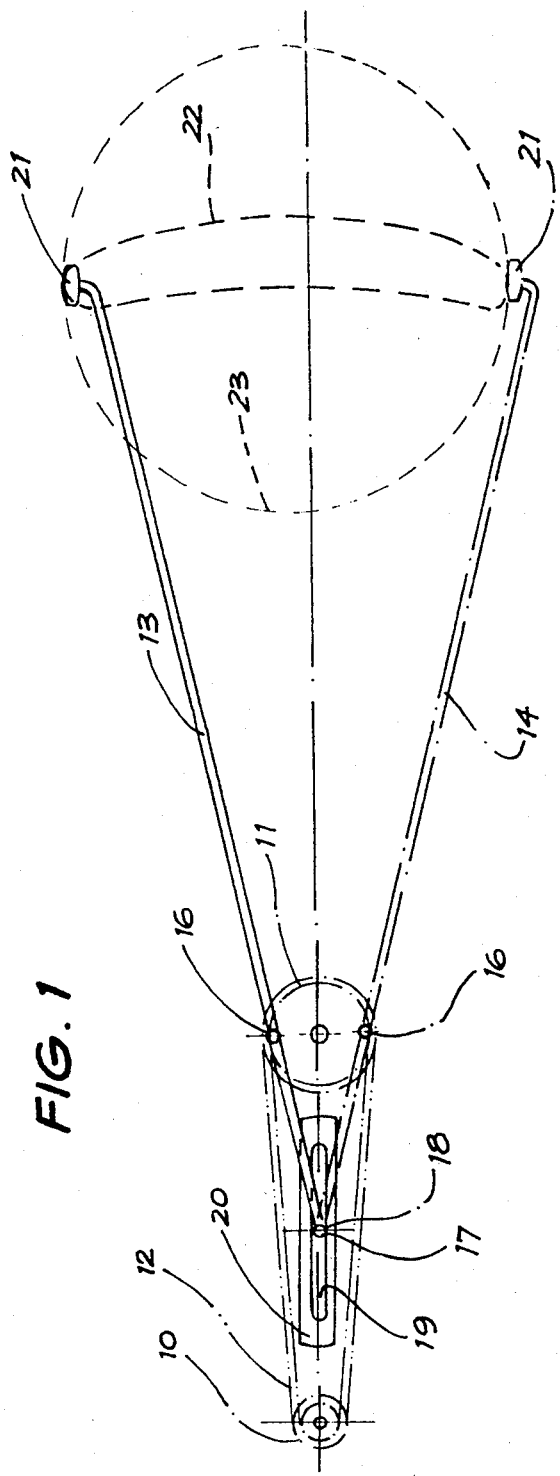
FIG. 1 is a schematic illustration of a first embodiment of the invention.

FIG. 1 of the drawings illustrates schematically a drive mechanism for a bicycle (not shown) which has been modified in accordance with the invention. The drive mechanism incorporates a conventional chain and sprocket arrangement consisting of a driven sprocket wheel 10 mounted coaxially with, and coupled to, the rear wheel (not shown) of the bicycle and a drive sprocket wheel 11 mounted on the frame of the bicycle and coupled to the sprocket wheel 10 by a chain 12. In a conventional arrangement a pair of crank arms (not shown) would be connected to the drive sprocket wheel, each carrying a pedal, whereby driving effort applied to the pedals would be transmitted by the chain and sprocket arrangement to the rear wheel. However, in this embodiment, the pedals are removed from the conventional position and a pair of levers 13 and 14, are pivotally mounted, one at each side of the frame, by means sliding pivot connections 17 and 18 respectively. The pivot connections are sidable within slots 19 (only one of which is shown) formed in respective brackets 20 attached to the frame. Each lever is pivotally connected at 16 to the respective crank arm, and a pedal 21 is mounted at the free end of each lever. The two levers are arranged to alternately transmit pedal effort to the crank, which is then transmitted to the rear wheel.

A feature of the arrangement described and illustrated schematically is that the pedals 21 each moves in a shorter path than a conventional pedal for an equivalent effort transmitted to the rear wheel. In the conventional bicycle drive system the pedal moves in a circular path in which the distance travelled by the pedal is slightly greater than three times the linear vertical displacement of the pedal. With the arrangement illustrated, however, the pedal moves in a roughly crescent shaped path 22 in which the total distance is significantly less than three times the linear vertical displacement of the pedal. By way of comparison, the circular path, 23, followed by a pedal in a conventional system is shown superimposed on the path 22, although it will be appreciated that these paths would not be in the same positions. Also, the radial distance of the pivot points 16 from the axis of the crank may be varied to adjust the pedal stroke.

Figure 2:
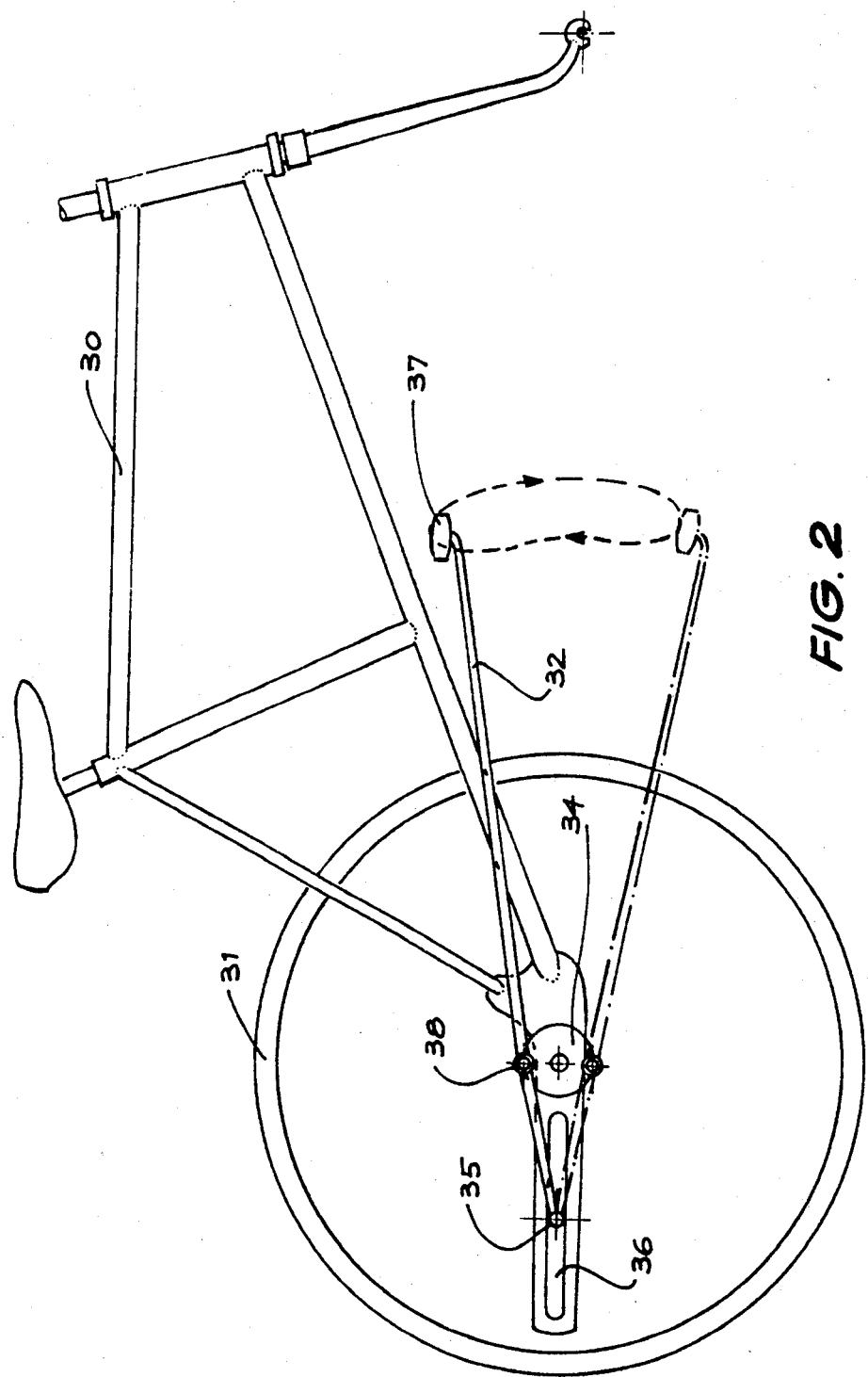
FIG. 2 is a schematic illustration of a second embodiment of the invention.

The embodiment shown schematically in FIG. 2 is a bicycle comprising a frame 30 having a rear wheel 31 and a front wheel (not shown) mounted thereon in the usual manner. In this embodiment the drive mechanism comprises a lever 32 drivingly coupled to a disc 34 which is mounted on the same axle as the rear wheel 31 and is drivingly coupled to the rear wheel through gears (not shown), mounted on a hub of the rear wheel. The lever 32 is pivotally connected at one end by way of a fulcrum 35 which is slidable along a slot 36 formed in a part of the frame which extends behind the axle of the wheel 31. A pedal 37 is mounted to the opposite end of the lever 3 and a pivot connection 38 is formed between the lever and the disc 34. A similar arrangement (not shown) is provided on the opposite side of the bicycle to be coupled in a similar manner to the rear wheel 31. The two levers are arranged to alternately transmit pedal effort to the rear wheel.

The embodiment described above has the advantage that the need for a chain and sprocket arrangement is avoided and the number of moving parts are reduced. The disc 34 (and the complementary disc, which is not shown, on the other side of the bicycle) may be replaced by an equivalent member, such as a rotating bar or crank.

Figure 3:
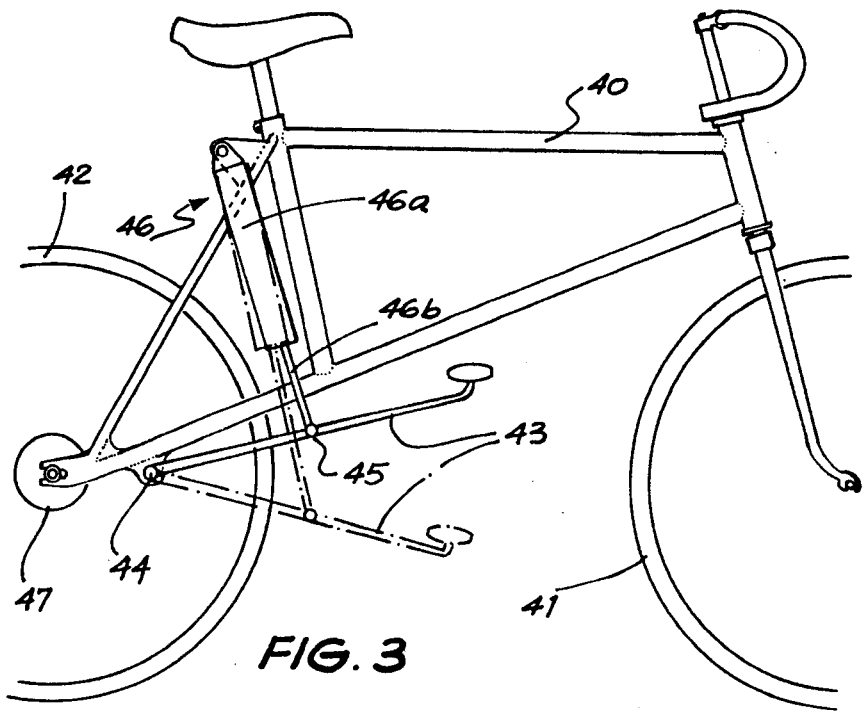
FIG. 3 is a schematic illustration of a third embodiment of the invention.

FIG. 3 illustrates a bicycle comprising a frame 40 mounted on wheels 41 and 42, the latter being the driven wheel of the bicycle. A lever 43 is pivotally mounted to the frame at a fixed point 44 and is pivotally connected at a point 45 to a hydraulic pump 46. The pump, which may be of conventional construction, comprises pump body 46a which is pivotally mounted to the frame and a piston rod 46b which is pivotally connected to the lever. A similar arrangement (not shown) is provided to operate alternately therewith. Hydraulic pressure from the respective pumps is fed to a hydraulic motor which is mounted within a hub 47 of the driven wheel 42. Alternatively the hydraulic motor may be mounted adjacent to, and coupled to a drive sprocket wheel which in turn is connected to a driven sprocket wheel by a chain to drive the rear wheel.

In operation of the bicycle, the rider alternately applies foot pressure to pedals 43a mounted one to the free end of each lever, whereby the levers pivotably oscillate to generate hydraulic pressure by the pumps 46. This hydraulic pressure in turn drives the hydraulic motor connected to the rear wheel.

Among the advantages obtainable with this embodiment is that a chain and sprocket or gears is avoided, permitting simplified mechanical construction and, possibly, reduced weight. Another advantage is that it overcomes a problem previously encountered that the driven wheel axle had to be rotatably mounted. In the embodiment the hydraulic motor is mounted in a hub part of the rear wheel and is rotatably supported on a fixed axle.

Figure 4:
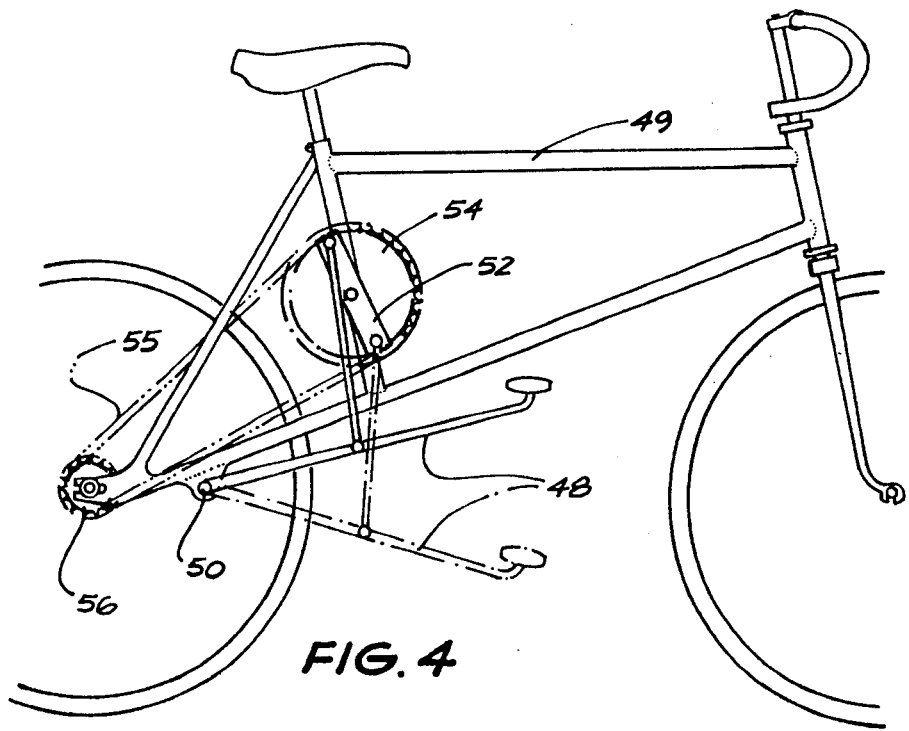
FIG. 4 is a schematic illustration of a fourth embodiment of the invention.

In the embodiment of FIG. 4, a pair of levers 48 are pivotally mounted one at each side of a bicycle frame 49 to respective fixed pivot points 50 on the frame. Each lever is pivotally coupled by a link arm 51 to a crank 52 which is rotatably mounted to the frame. A sprocket wheel 54 is fixed to the frame and is coupled by a chain 55 to a second sprocket wheel 56 which in turn is coupled in conventional manner to the rear wheel of the bicycle.

In operation, foot pressure is applied alternately to pedals 57 mounted one to the free end of each lever. The oscillatory motion thus applied to the levers is transmitted to the crank 52 and, in turn, by the chain and sprocket arrangement to the rear wheel.

Figure 5:
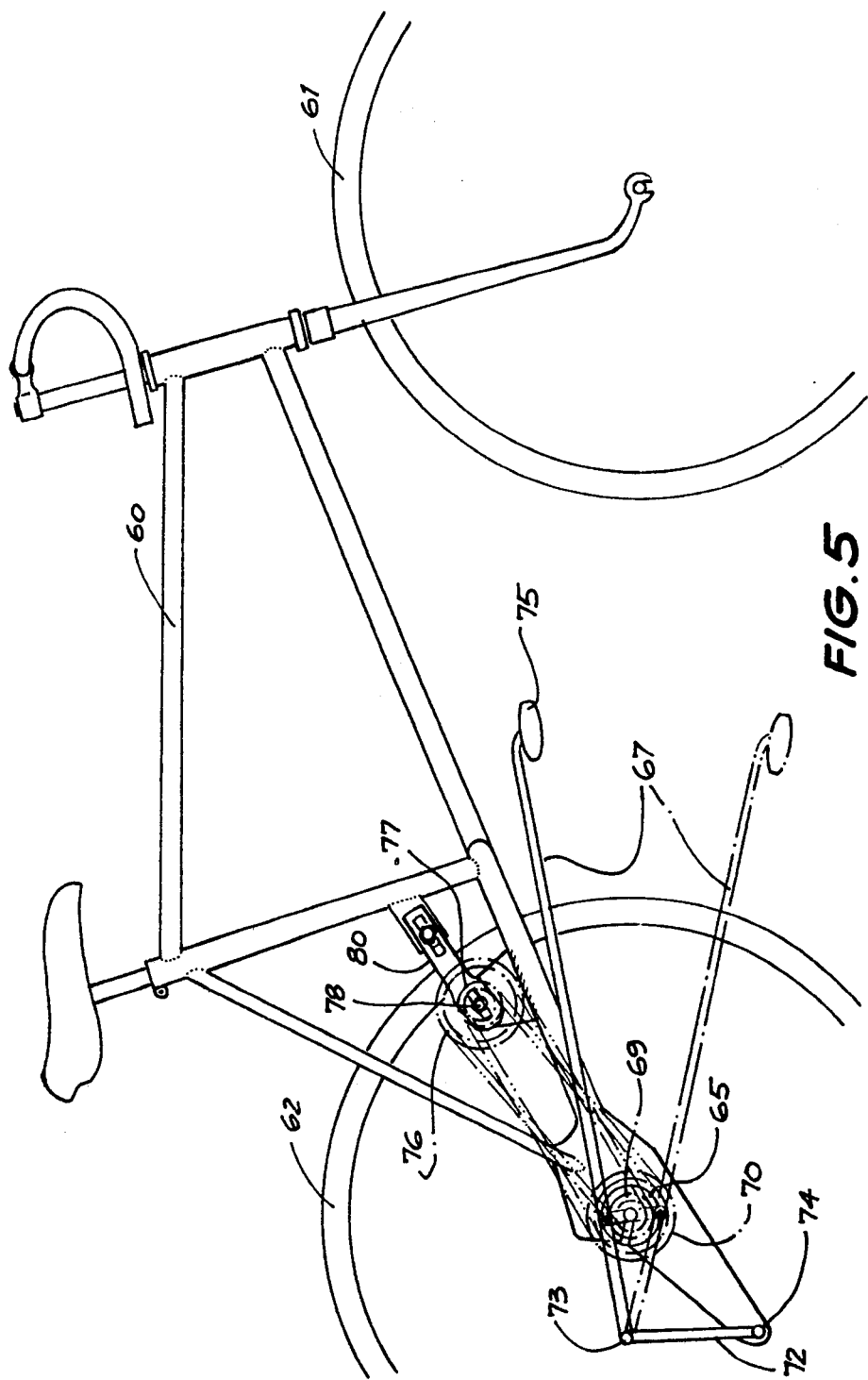
FIG. 5 is an elevational view of a fifth, and preferred, embodiment of the invention.
Figure 6:
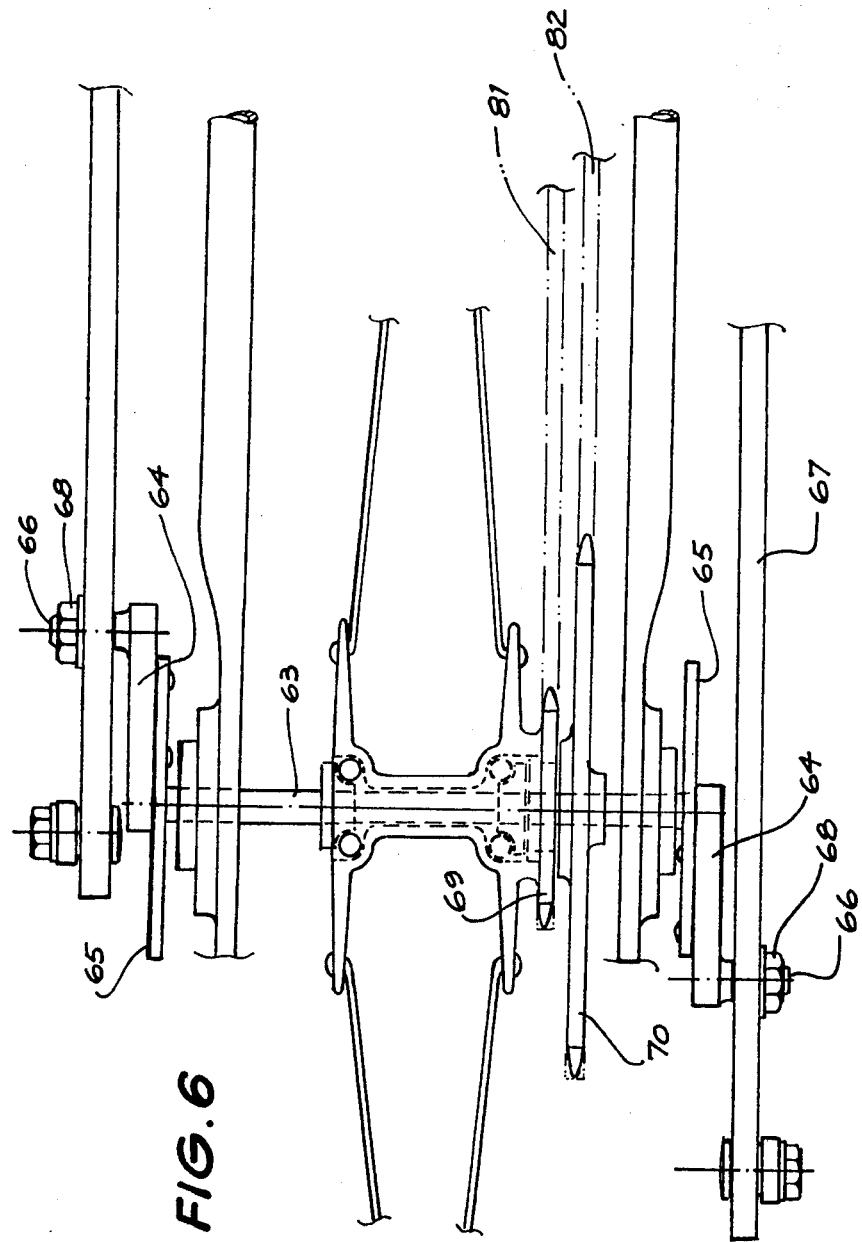
FIG. 6 is a detailed plan view of a part of the embodiment of FIG. 5.
Figure 7:
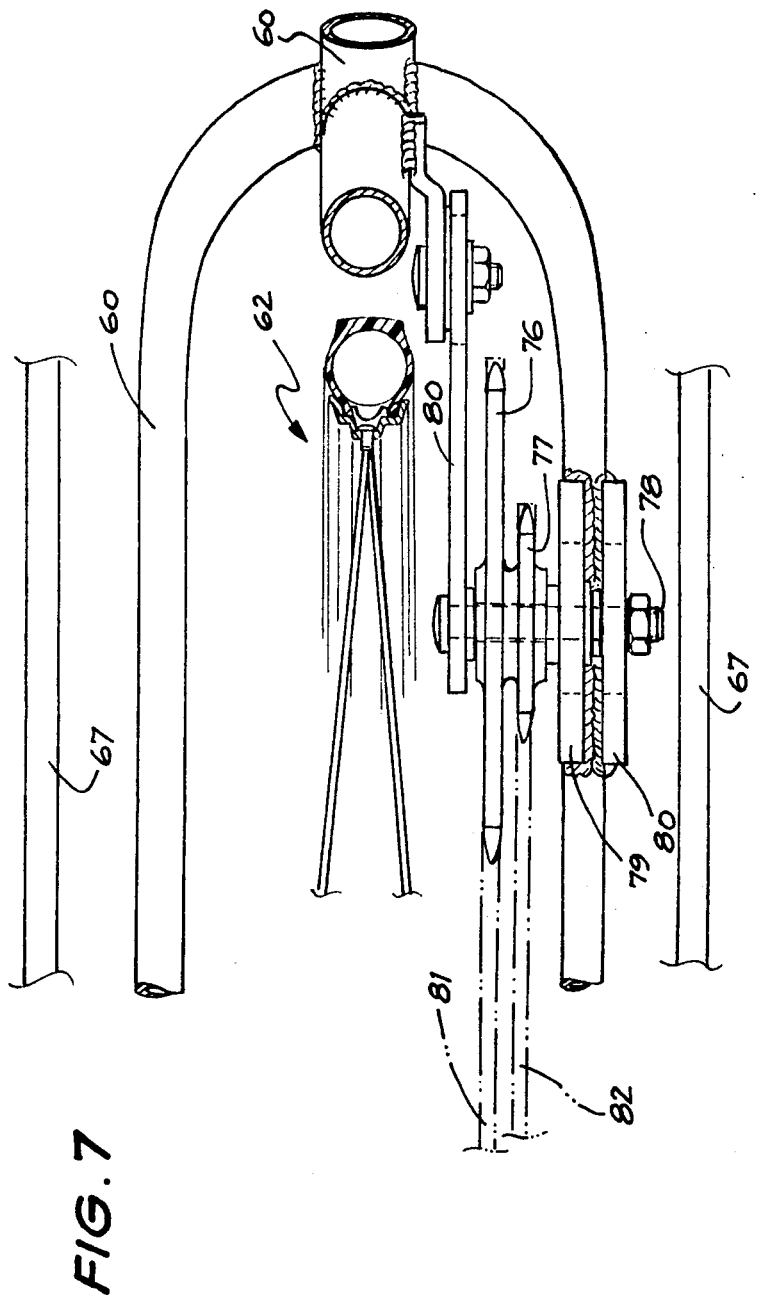
FIG. 7 is a detailed plan view of another part of the embodiment of FIG. 5.

The preferred embodiments illustrated in FIGS. 5 to 7 comprises a frame 60 mounted on front and rear wheels 61 and 62 respectively. As best shown in plan view in FIG. 6, the rear wheel is rotatably supported on the axle 63 of a crank 64, which in turn is rotatably journalled in a fork section of the frame. A crank disc 65 is fixed to each end of the crank axle and a crank pin 66 is eccentrically fixed to the crank disc, the crank pins being positioned 180° relative to each other. A lever 67 is pivotally journalled near one end thereof to each pin 66 and held thereon by a bolt 67. A pair of sprocket wheels 69 and 70 are mounted coaxially with the hub 71 of the rear wheel. The sprocket wheel 69, which is half the diameter of the sprocket wheel 69, is fixed to the hub 71. The sprocket wheel 70 is fixed to the axle of the crank.

Referring to FIG. 5, a link arm 72 is pivotally connected at one end to a pivot point 73 on each lever and, at its other end, to a pivot point 74 on a downward extension of the frame 60. The pivot point 73 is spaced a small distance rearwardly of the position of the crank pin 66. A pedal 75 is mounted to the forward end of each lever.

Referring to FIG. 7, a second pair of sprocket wheels 76 and 77 respectively are mounted rotatably on an axle 78, one end of which is secured by a bolt to a bracket 79 welded to the fork section of the frame 60 and the other end of which is secured by a bolt to a second bracket 80 which is fixed to a vertical section of the frame.

The sprocket wheels 76 and 77 are fixed to each other and are connected respectively by a chain 81 and a chain 82 to the sprocket wheels 69 and 70. The sprocket wheel 76 is twice the diameter of the sprocket wheel 77. Tension in the chains can be adjusted by adjusting the position of axle 78 which supports the sprocket wheels 76 and 77. For this purpose, the bolts securing the axle 78 pass through slots in the brackets 79 and 80. Adjustment is obtained by loosening the bolts and sliding the axle 78 to the position for correct tension. The bolts are then tightened.

In operation, foot pressure is applied alternately to the pedals to oscillate the levers 67, causing the crank to rotate. Rotary motion of the crank is transmitted by way of sprocket wheel 70 and chain 82 to the sprocket wheel 77, and is transmitted in turn by the sprocket wheel 76 and chain 81 to the sprocket wheel 69, the last being coupled to the rear wheel hub to drive the rear wheel.

Among the features of the arrangement described is that pedal movement is substantially reciprocatory in contrast to the circular movements of conventional arrangements. Thus a greater proportion of pedal effort is effective to deliver power to the rear wheel and rider fatigue may be reduced because of the shortened pedal travel, even though the pedal stroke may be the same as that for a conventional bicycle. Also, mechanical construction is relatively simple and efficient in operation. Another advantage is that the dead centers for the two levers, that is, the positions in each cycle in which the torque applied to the crank changes direction, are different. In other words, the forward stroke is longer than the return stroke.

A further advantage is with the same overall pedal movement for a given drive ratio, an increased bicycle travel is achieved.

Figure 8:
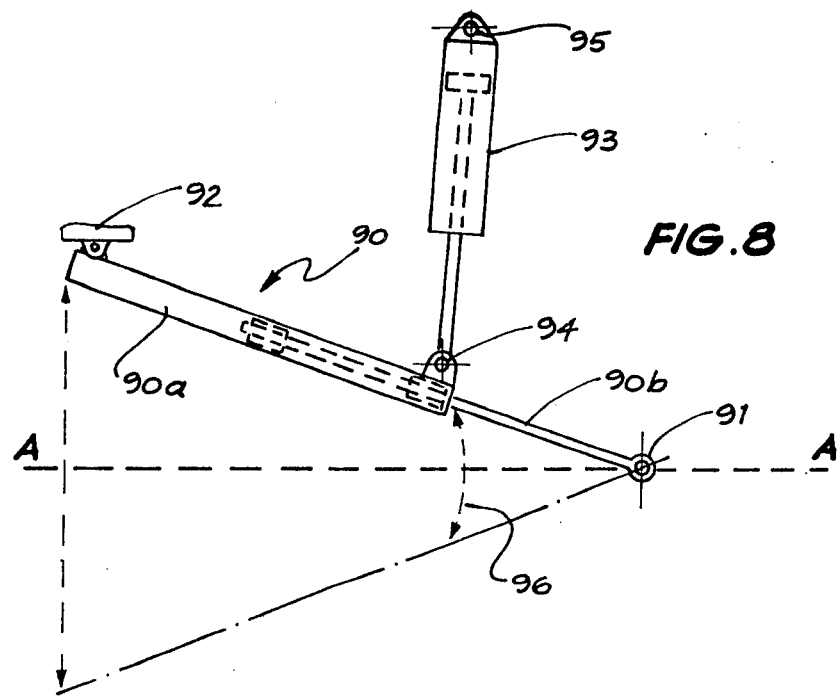
FIG. 8 is a schematic illustration of a lever mechanism in accordance with an embodiment of the invention.

In the embodiment shown in FIG. 8, a variable length lever 90 is pivotally connected at one end 91 to a support (not shown) and has a pedal 92 attached to the opposite, or free end of the lever. The lever consists of an outer part 90a which is telescopically coupled with an inner part 90b so that the two parts are movable slidably relative to each other in the longituidnal direction of the lever. A pump 93 is pivotally connected to the outer part 90a at a point 94 which is spaced from the free end of the lever in the direction towards the pivot connection or fulcrum 91. In this case the pivot connection 94 is adjacent to the inner end of the part 90a, which is remote from its free end. The pump 93 is also pivotally connected at its opposite end 95 to the support. The support, which is not shown in the drawings, may consist of a bicycle frame and a conduit (not shown) may be connected to deliver fluid pressure generated by the pump, in use, to a hydraulic motor coupled to the rear wheel of the bicycle (also not shown). In this arrangement the lever and pump combination replace the chain and sprocket drive arrangement of a conventional bicycle.

In operation, the lever 90 pivots about the fulcrum 91 between upper and lower limits as indicated in the drawing. The free end of the lever is constrained to move in a relatively straight line by any suitable means (not shown) which may, for example, comprise a roller attached to the free end of the lever, the roller engaging a guide track which is fixed to the frame. A second lever and pump combination similar to that illustrated may be provided and coupled for alternate operation in a manner analogous to the two pedals in a conventional bicycle arrangement.

An important feature of the arrangement illustrated is that the pedal 92 moves in a substantially straight path, compared with the circular path followed by a pedal in a conventional bicycle. This considerably reduces the overall pedal movement, even though the vertical pedal displacement may be the same. The force transfer characteristics between the pedal and the rear wheel are improved compared with those for a conventional bicycle drive such that fatigue to the rider may be reduced. In this case pivotal motion of the lever results in fluid pressure being generated by the pump 93, which pressure is used to drive the hydraulic motor coupled to the rear wheel. The pivot connection 94 moves in an arcuate path 16 which is directed towards the fulcrum 91. The force transmission ratio between the pedal 92 and the pump 93 increases accordingly as the pedal moves toward the axis A—A and is at a minimum at the extremities of pedal displacement on either side of that axis. This characteristic favourably affects performance, to reduce rider fatigue.

Figure 9:
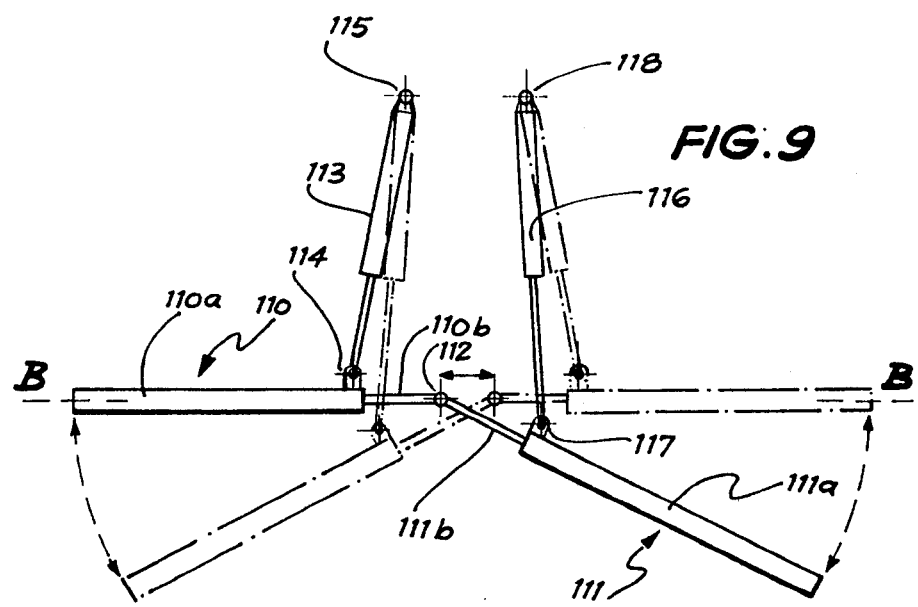
FIG. 9 is a schematic representation of a lever mechanism in accordance with a further embodiment of the invention.

In the embodiment illustrated in FIG. 9 a pair of levers 110 and 111 are pivotally connected to a support (not shown) by a common fulcrum 112. The lever 110 consists of an outer part 110a which is telescopically coupled to an inner part 110b. The lever 111 similarly has outer and inner parts 111a and 111b which are telescopically coupled so as to be slidable relative to each other in the longitudinal direction of the lever. A pump 113 is pivotally connected to one end of the outer part 110a which is remote from the free end of the latter. The pump 113 is also pivotally connected at one end to the support by way of a pivot connection 115. Similarly, a pump 116 is pivotally connected to the lever 111 and to the support at pivot connections 117 and 118 respectively. The common fulcrum 112 is constrained by guide means (not shown) to reciprocate slidably along the axis B—B. The support may comprise the frame of a bicycle in which the rear wheel is driven by a hydraulic motor coupled to the pump 113 and 116.

In operation, the levers 110 and 111 pivot along arcuate paths extending below the axis B—B. The levers are coupled so that as one lever moves downwardly the other moves upwardly so that driving effort is applied alternately to pedals (not shown) attached to the free ends of the levers. The pumps 113 and 116 generate hydraulic pressure in response to pivotal motion of the levers and this pressure is used to drive the hydraulic motor (not shown) coupled to the rear wheel.

The free ends of the levers are constrained to move in predetermined paths which, in this case are arcuate but the curvature of the arcs do not differ significantly from a straight line. The free ends of the levers could be constrained to move, for example, in a vertical straight line if desired.

A feature of the embodiment illustrated in FIG. 9 is that, as the fulcrum 112 reciprocates along the axis B—B, the spacing between the fulcrum and pivot connection 114 and that between the fulcrum and pivot connection 116 each varies in a predetermined manner. In particular, in the position of the levers as indicated by the solid outlines, the spacing between the pivot 114 and the fulcrum 112 is a minimum to give a maximum force transfer ratio between the lever 110 and the pump 113. At the same time the spacing between the pivot 117 and fulcrum 112 is a maximum to give a minimum force transfer ratio between the lever 111 and the pump 116. The converse applies when the levers are in the positions indicated by the broken outlines. An advantage of this arrangement is that pedal effort increases in the direction of downward pivot movement of the levers, which characteristic is believed to enable maximum efficiency in the conversion of pedal effort to power delivered to the rear wheel.

Figure 10:
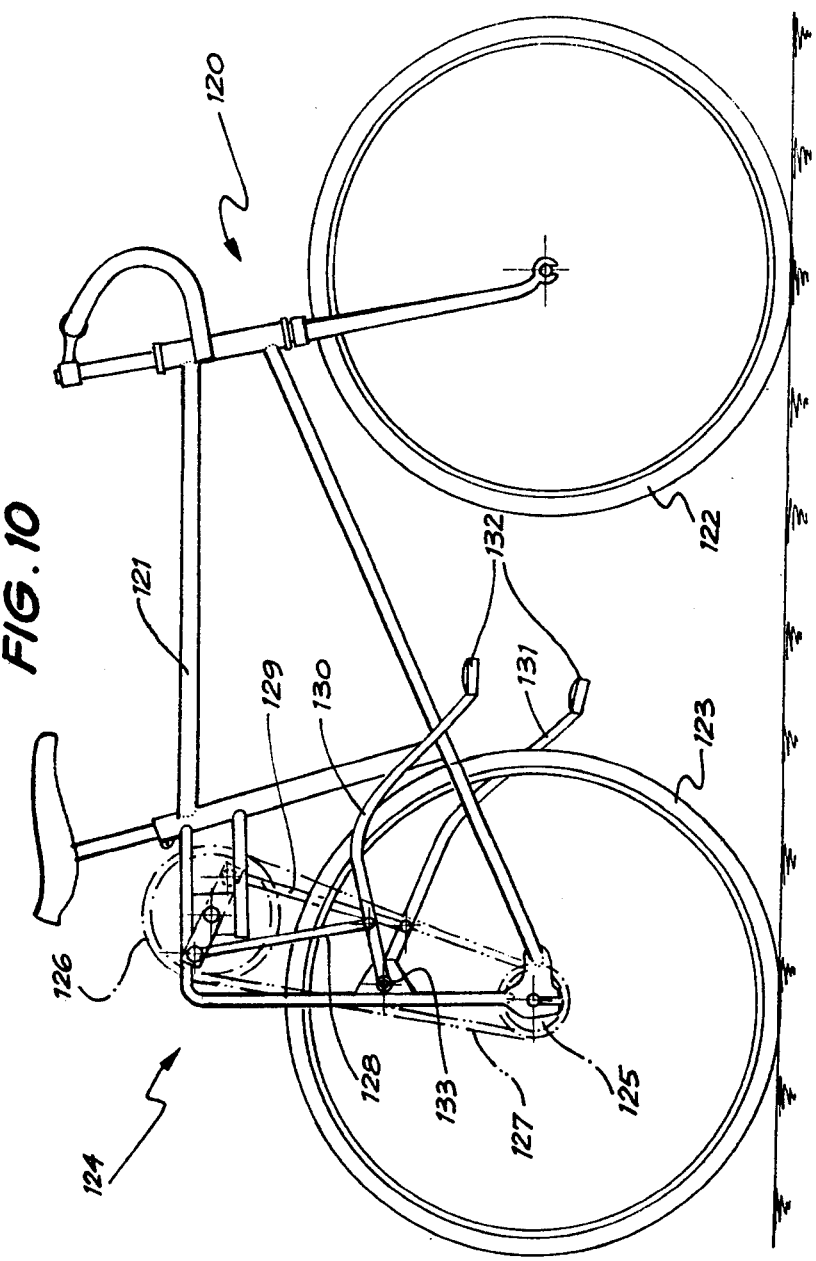
FIG. 10 is a schematic side elevation of a bicycle.
Figure 11:
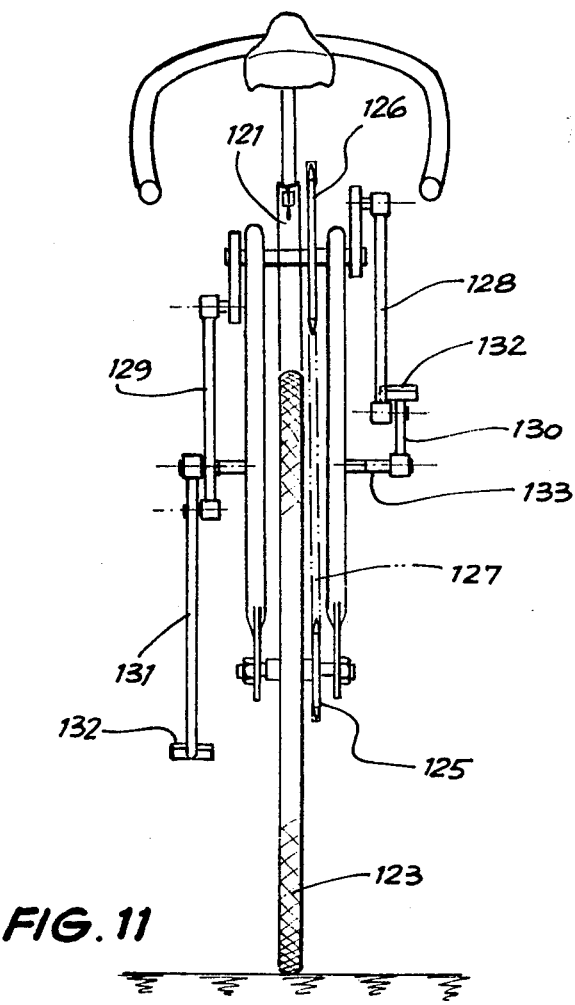
FIG. 11 is a schematic front elevation of the bicycle of FIG. 10.

In FIGS. 10 and 11 there is schematically depicted a bicycle 120 having a frame 121 which rotatably supports a front dirigible wheel 122 and a rear driven wheel 123. The rear wheel 123 is driven by means of a pedal drive assembly 124 which includes a rear sprocket 125 drivingly associated with the wheel 123. Also rotatably supported by the frame 121 is an upper sprocket 126 which is power transmittingly coupled to the sprocket 125 by means of a chain 127. Fixed to the sprocket 126 are two linkages 128 and 129 which are caused to reciprocate as the sprocket 126 rotates.

There is further supported on the frame 121 two pedal levers 130 and 131 which are each provided with a pedal 132 each fixed stationary to the respective lever 130 or 131. The levers 130 and 131 are pivotally coupled to the frame 121 by means of a pin 133.

The linkages 128 and 129 extend to and are pivotally coupled to the levers 130 and 131 so that upon the levers 130 and 131 being moved under the influence of a rider exerting leg pressure on the pedals 132, the linkages 128 and 129 are caused to reciprocate thereby causing rotation of the sprocket 126.

It should be particularly noted that each pedal 130 is fixed stationary to its respective lever 130 or 131. This has the advantage of increasing the effective length of the levers 130 and 131 while providing a pedal arrangement which is ergonomically desirable.

What I claim is:

1. A velocipede including a frame; at least one rear driven wheel rotatably mounted on the frame; and a pedal drive assembly oppositely mounted on the frame and operatively associated with said wheel to drive the wheel; said assembly including a pair of pedal levers pivotally mounted on the frame so as to be pivotable about a first axis, a pedal mounted on the other end of each lever, a drive sprocket mounted on said frame for rotation about a fixed second axis, a driven sprocket attached to said wheel so as to drive same, said driven sprocket being rotatable about the rotational axis of said wheel, a link being pivotally attached to each lever intermediate its extremities and pivotally attached to said drive sprocket so as to rotate same upon reciprocation of said pedals, and wherein said first axis is spaced from the wheel axis and is fixed relative to the frame at a location above said wheel.

2. The velocipede of claim 1 wherein said first axis is located generally vertically above the axis of said wheel.

3. The velocipede of any one of claim 1 wherein said pedals are non-rotatably fixed to said levers.

* * * * *